US012361815B2

(12) United States Patent
Kulkarni et al.

(10) Patent No.: US 12,361,815 B2
(45) Date of Patent: *Jul. 15, 2025

(54) EVENT DEVICE OPERATION

(71) Applicant: Honeywell International Inc., Charlotte, NC (US)

(72) Inventors: Sagar Ramesh Kulkarni, Bangalore (IN); Sudeep Jayakumar Duge, Bangalore (IN); Anu Gopinath, Bangalore (IN); Chalapathi Subramanyam, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 86 days.

This patent is subject to a terminal disclaimer.

(21) Appl. No.: 18/225,723

(22) Filed: Jul. 25, 2023

(65) Prior Publication Data

US 2023/0368642 A1 Nov. 16, 2023

Related U.S. Application Data

(63) Continuation of application No. 17/551,375, filed on Dec. 15, 2021, now Pat. No. 11,749,096.

(51) Int. Cl.
*G08B 25/00* (2006.01)
*G08B 25/14* (2006.01)

(52) U.S. Cl.
CPC ......... *G08B 25/007* (2013.01); *G08B 25/009* (2013.01); *G08B 25/14* (2013.01)

(58) Field of Classification Search
CPC ..... G08B 25/007; G08B 25/009; G08B 25/14
See application file for complete search history.

(56) References Cited

U.S. PATENT DOCUMENTS

| | | | |
|---|---|---|---|
| 6,803,854 | B1 | 10/2004 | Adams et al. |
| 8,077,026 | B2 | 12/2011 | Jobe et al. |
| 8,779,921 | B1 | 7/2014 | Curtiss |
| 9,905,115 | B2 | 2/2018 | Venkatesh et al. |
| 10,140,839 | B1 | 11/2018 | Smith et al. |
| 10,297,129 | B2 | 5/2019 | Piccolo, III |
| 10,540,886 | B2 | 1/2020 | Hamilton et al. |
| 11,043,111 | B1 | 6/2021 | Escofet |

(Continued)

FOREIGN PATENT DOCUMENTS

WO 2020123417 A2 6/2020

*Primary Examiner* — John A Tweel, Jr.
(74) *Attorney, Agent, or Firm* — Brooks, Cameron & Huebsch, PLLC

(57) ABSTRACT

Devices, systems, and methods for event device operation are described herein. In some examples, one or more embodiments include a mobile device comprising a user interface, a memory, and a processor to execute instructions stored in the memory to receive a signal from a control panel of a control system in response to the mobile device connecting to the control panel, generate, based on the signal, an event device analysis for a number of event devices included in the control system, display, via the user interface, the event device analysis, in response to a selection of a fault corresponding to an event device from the list of event devices having faults, display a diagnostic guide to remedy the fault, and control, in response to an input to the user interface, at least one of operation of the control panel and an event device of the number of event devices.

20 Claims, 5 Drawing Sheets

(56) References Cited

U.S. PATENT DOCUMENTS

| | | | | |
|---|---|---|---|---|
| 11,587,429 | B1 * | 2/2023 | Kulkarni | G08B 25/006 |
| 11,595,838 | B2 * | 2/2023 | Wolf | H04B 17/318 |
| 11,749,096 | B2 * | 9/2023 | Kulkarni | G08B 29/145<br>340/506 |
| 11,984,013 | B2 * | 5/2024 | Kulkarni | G08B 27/00 |
| 2005/0104724 | A1 | 5/2005 | Faltesek | |
| 2005/0285730 | A1 | 12/2005 | Turner | |
| 2009/0231119 | A1 | 9/2009 | Cohen | |
| 2009/0315699 | A1 | 12/2009 | Satish et al. | |
| 2014/0167969 | A1 | 6/2014 | Wedig et al. | |
| 2014/0191875 | A1 | 7/2014 | Wedig et al. | |
| 2017/0321923 | A1 | 11/2017 | Wiens-Kind et al. | |
| 2017/0352257 | A1 | 12/2017 | Oliver et al. | |
| 2018/0012482 | A1 | 1/2018 | Brown et al. | |
| 2018/0122221 | A1 | 5/2018 | Norton et al. | |
| 2018/0306616 | A1 | 10/2018 | Gillette, II et al. | |
| 2018/0359220 | A1 | 12/2018 | Trivelpiece et al. | |
| 2020/0243203 | A1 | 7/2020 | Reddy et al. | |
| 2020/0394896 | A1 | 12/2020 | Cohn et al. | |
| 2021/0056834 | A1 | 2/2021 | Wolff | |
| 2021/0150877 | A1 | 5/2021 | Menzel | |
| 2021/0295674 | A1 | 9/2021 | Choudhary et al. | |
| 2021/0350692 | A1 | 11/2021 | Nalukurthy et al. | |
| 2021/0350693 | A1 | 11/2021 | Nalukurthy et al. | |
| 2023/0005358 | A1 | 1/2023 | Cohn et al. | |

* cited by examiner

EVENT DEVICE OPERATION

PRIORITY INFORMATION

This application is a continuation of U.S. application Ser. No. 17/551,375, filed Dec. 15, 2021, the contents of which are incorporated by reference.

TECHNICAL FIELD

The present disclosure relates to devices, systems, and methods for event device operation.

BACKGROUND

Large facilities (e.g., buildings), such as commercial facilities, office buildings, hospitals, and the like, may have an alarm system that can be triggered during an emergency situation (e.g., a fire) to warn occupants to evacuate. Such an alarm system can be a part of a control system that controls operation of the devices included in the alarm system. For example, an alarm system may include a control panel (e.g., a fire control panel) and a plurality of event devices (e.g., hazard sensing devices, input devices, output devices, etc.) located throughout the facility (e.g., on different floors and/or in different rooms of the facility) that can perform an action when a hazard event is occurring in the facility and provide a notification of the hazard event to the occupants of the facility via alarms or other mechanisms.

Maintaining the alarm system can include regular testing of event devices. Such regular testing may be mandated by codes of practice in an attempt to ensure that the event devices are functioning properly.

DETAILED DESCRIPTION

Figure 1:
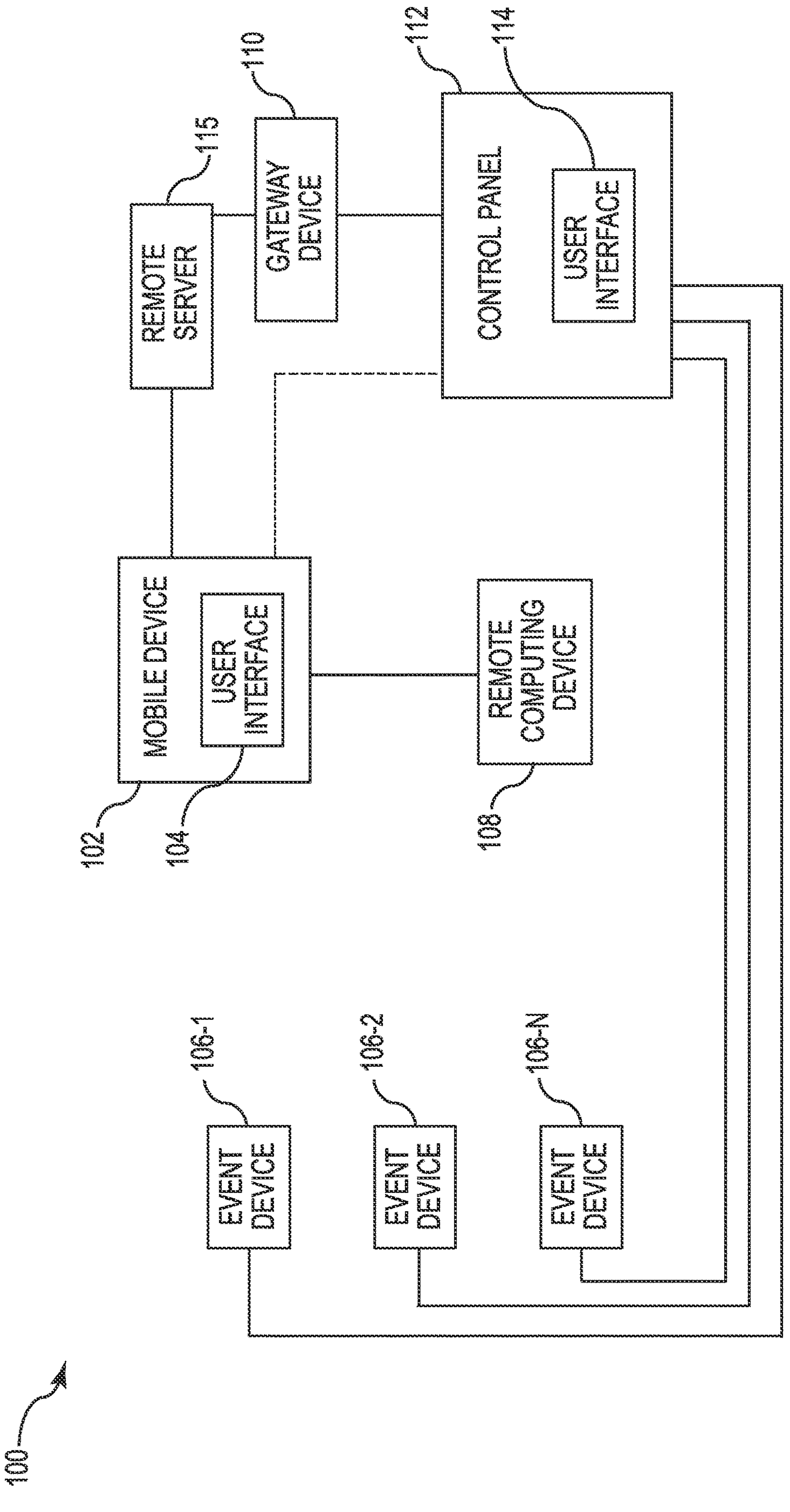
FIG. 1 is an example of a system for event device operation, in accordance with one or more embodiments of the present disclosure.

Devices, systems, and methods for event device operation are described herein. In some examples, one or more embodiments include a mobile device comprising a user interface, a memory, and a processor to execute instructions stored in the memory to receive a signal from a control panel of a control system in response to the mobile device connecting to the control panel, generate, based on the signal, an event device analysis for a number of event devices included in the control system, display, via the user interface, the event device analysis, in response to a selection of a fault corresponding to an event device from the list of event devices having faults, display a diagnostic guide to remedy the fault, and control, in response to an input to the user interface, at least one of operation of the control panel and an event device of the number of event devices.

Maintenance of event devices can include a first user (e.g., such as a technician, engineer, etc.) walking around the facility and visually checking the alarm system components, typically, at the same time as they carry out functional testing of event devices and other components of the alarm system. For example, carrying out smoke testing of fire sensors and visual inspection of fire sensors at the same time the inspector is close enough to visually inspect each fire sensor. While the first user is functionally testing and visually inspecting event devices, a second user may typically interpret signals received at the alarm system control panel. Such signals can be the result of the first user functionally testing event devices in the facility.

Such a manual testing process between the second user at the control panel and the first user testing event devices in the facility may result in costly maintenance, as two users have to perform the testing process. Further, certain users may be unskilled with alarm systems, resulting in such users not identifying issues, misdiagnosing issues, identifying there is an issue but not understanding what the issue is, etc. As a result, such users may not be able to locate and/or diagnose certain issues (e.g., such as faults) in the alarm system, resulting in calls to technical support lines, additional time spent by other skilled users diagnosing such issues (e.g., remotely, or by traveling to the facility). Further, in some examples certain issues may cause a user interface of a control panel to display an error, but such an error may not be legible on the control panel.

Event device operation according to the present disclosure can allow for a user to utilize a mobile device to view an event device analysis and control operation of the control panel and/or event devices in the facility via the mobile device. The mobile device can further display a duplicate display of the user interface of the control panel. Such an approach can allow for a user to perform tests on event devices, perform maintenance operations, view current event device operational information, and/or diagnose and fix faults associated with event devices and/or the control panel, among other uses without having a second user waiting by the control panel and having to make back and forth trips between the control panel and event devices within the facility. Accordingly, such an approach can allow for ease in convenience in alarm system operation, maintenance activities, fault troubleshooting, and/or product knowledge support while also saving time and/or cost, as one user can perform such activities using the mobile device instead, as compared with previous approaches of one user monitoring an event device and one user monitoring the control panel.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 is an example of a system 100 for event device operation, in accordance with one or more embodiments of the present disclosure. The system 100 can include a mobile device 102, event devices 106-1, 106-2, 106-N (referred to collectively herein as event devices 106), remote computing device 108, gateway device 110, and control panel 112.

As illustrated in FIG. 1, the system 100 can include a control panel 112. As used herein, the term "control panel" refers to a device to control components of a control system of a facility. For example, the control panel 112 can be a fire control panel that can receive information from event devices 106 and determine whether a hazard event is occurring or has occurred.

The control panel 112 can include a user interface 114. As used herein, the term "user interface" refers to a device to provide (e.g., display and/or present) information to a user, and/or receive information from (e.g., input by) a user. For instance, in some embodiments, the user interface 114 can be a graphical user interface (GUI) that can provide and/or receive information to and/or from the user of the control panel 112. The user interface 114 can be, for instance, a touch-screen (e.g., the GUI can include touch-screen capabilities). Alternatively, the user interface 114 can be a part of a television, computer monitor, mobile device screen, other type of display device, or any combination thereof, connected to the control panel 112 and configured to receive a video signal output from the control panel 112.

The control panel 112 can be connected to the event devices 106. As used herein, the term "event device" refers to a device that can receive an input relating to an event and/or generate an output relating to an event. Such an event can be, for instance, a hazard event such as a fire. For example, an event device 106 can receive an input relating to a fire occurring in the facility. Such event devices 106 can be a part of a control system of the facility and can include devices such as fire sensors, smoke detectors, heat detectors, carbon monoxide (CO) detectors, or combinations of these; interfaces; pull stations; input/output modules; aspirating units; and/or audio/visual devices (e.g., speakers, sounders, buzzers, microphones, cameras, video displays, video screens, etc.), among other types of event devices.

In some examples, the event devices 106 can be automatic, self-test devices, such as smoke detectors, heat detectors, CO detectors, and/or others. Such self-test devices can include mechanisms that generate aerosols, heat, carbon monoxide, etc. and sense these items as appropriate to the type of device being tested in the device to test the performance of the device. This can, for example, be to test the event device's thermal and/or photo sensing capabilities. However, embodiments of the present disclosure are not so limited to automatic, self-test devices. For example, the event devices 106 can be non-self-test devices that have to be manually tested by a user. Additionally, in some examples, the event devices 106 can include combinations of automatic, self-test devices as well as non-self-test devices.

The system 100 can include a mobile device 102. As used herein, the term "mobile device" refers to devices that are (or can be) carried and/or worn by a user. For example, mobile device 102 can be a phone (e.g., a smart phone), a tablet, a personal digital assistant (PDA), smart glasses, and/or a wrist-worn device (e.g., a smart watch), among other types of mobile devices.

The mobile device 102 can include a user interface 104. For instance, in some embodiments, the user interface 104 can be a graphical user interface (GUI) that can provide and/or receive information to and/or from the user of the mobile device 102. The user interface 104 can be, for instance, a touch-screen (e.g., the GUI can include touch-screen capabilities). Alternatively, the user interface 104 can be a part of a television, computer monitor, mobile device screen, other type of display device, or any combination thereof, connected to the mobile device 102 and configured to receive a video signal output from the mobile device 102.

As illustrated in FIG. 1, the mobile device 102 can be connected to a remote computing device 108. The remote computing device 108 can be, for example, a remote server. The remote computing device 108 can be a cloud-computing environment. In some examples, the remote computing device 108 can be running on the control panel 112 or on the mobile device 102.

The mobile device 102 can be connected to the control panel 116 directly (e.g., via a wireless or wired network relationship) or via the gateway device 110. As used herein, the term "gateway device" refers to a device to provide an interface between the control panel 112 and remote server 115. In some examples, the remote server 115 can be a cloud-computing environment (e.g., a cloud-server).

The mobile device 102 can be connected to the gateway device 110 via a network. For example, the network can provide for a network relationship between the mobile device 102 and the gateway device 110/control panel 112. Such a network relationship can be a wired or wireless network connection. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, Long Term Evolution (LTE), visible light communication (VLC), Bluetooth, Worldwide Interoperability for Microwave Access (WiMAX), Near Field Communication (NFC), infrared (IR) communication, Public Switched Telephone Network (PSTN), radio waves, and/or the Internet, among other types of network relationships.

In some embodiments, the mobile device 102 may connect to the control panel 112 directly. For example, the mobile device 102 can connect to the control panel 112 directly via a wired connection (e.g., a cable, such as a serial cable or Universal Serial Bus (USB) cable connection) and/or wirelessly via a private wireless network (e.g., via a wireless transceiver device connected to the control panel 112, not illustrated in FIG. 1). Such embodiments may be utilized when security and/or privacy of information included on the control panel 112 is of concern.

In some embodiments, the mobile device 102 may connect to the control panel 112 by scanning a code associated with the control panel 112. For example, the control panel 112 may have a code (e.g., a barcode, QR code, etc.) associated therewith (e.g., as a sticker on the control panel 112, displayed via the user interface 114, etc.) and the user can scan the code, via the mobile device 102, to establish a connection between the mobile device 102 and the control panel 112.

Further, as illustrated in FIG. 1, the system 100 can include a remote server 115. The remote server 115 can be, for example, a server accessible by the mobile device 102 via the Internet.

As previously mentioned above, the mobile device 102 can be utilized to view an event device analysis of the event devices 106. Additionally and/or alternatively, the mobile device 102 can be utilized to control operation of the control panel 112 and/or event devices 106. Such operations are further described herein.

As mentioned above, the mobile device 102 can connect to the control panel 112 via the gateway device 110 or directly. In response to the mobile device 102 connecting to the control panel 112 of the control system shown in system 100, the mobile device 102 can receive a signal from the control panel 112. The signal can include, for instance, information about the control system shown in system 100. For example, the signal received by the mobile device 102 can include information about event devices 106, computing operations performed by the control panel 112, data stored by the control panel 112, and/or other information as is further described herein.

The mobile device 102 can generate, based on the received signal, an event device analysis for the number of event devices 106 included in the control system shown in system 100. The event device analysis can include a list of the number of event devices 106 of the control system and/or a list (e.g., a sub-list) of event devices out of the total number of event devices 106 having faults, as is further described herein.

In some examples, the event device analysis can include a list of a number of event devices 106 of the control system. For example, the mobile device 102 can generate, based on the received signal from the control panel 112, a list of the event devices 106-1, 106-2, 106-N included in the control system illustrated in FIG. 1. Accordingly, a user of the mobile device 102 can view different ones of the number of event devices 106 via the list as well as perform other actions, as is further described herein with respect to FIGS. 2-4.

In some examples, the event device analysis can include a list of the event devices of the number of event devices 106 having faults. As used herein, the term "fault" refers to a defect in a device that prevents normal operational behavior of the device. For example, the event device analysis can include a sub-list including event devices 106-1 and 106-2 where event devices 106-1 and 106-2 are event devices which have faults.

The mobile device 102 can display, via the user interface 104 of the mobile device 102, the event device analysis. For example, the mobile device 102 can display the list of the number of event devices 106 of the control system, as well as the list of the number of event devices 106 having faults (e.g., event device 106-1, 106-2).

In some examples, the user interface 114 of the control panel 112 can display information about the system 100. For example, the user interface 114 may display the list of event devices 106-1 and 106-2 having faults. The mobile device 102 can be configured to duplicate and display the user interface 114 of the control panel 112 on the user interface 104 of the mobile device 102. Accordingly, in an instance in which the user of the mobile device 102 is not proximate to the control panel 112 or the user interface 114 of the control panel 112 may not be legible, the mobile device 102 can reproduce (e.g., duplicate) and display the user interface 114 of the control panel 112 on the user interface 104 of the mobile device 102.

In some examples, the system 100 may be deployed in various regions around the world. Accordingly, different regions may include different languages, some including different alphanumeric characters. Accordingly, the mobile device 102 can display, via the user interface 104, the event device analysis in a language corresponding to a physical geographic location of the mobile device 102. The mobile device 102 may determine its physical geographic location (e.g., via global positioning systems (GPS), mobile device networks (e.g., 3G, 4G, 5G, etc.), via a user input, among other examples) and based on its physical geographic location, determine a language to display the event device analysis. For instance, in one example the mobile device 102 may be utilized in a system 100 deployed in India, and the mobile device 102 can display the event device analysis in Hindi. In another example, the mobile device 102 may be utilized in a system 100 deployed in the United States, and the mobile device 102 can display the event device analysis in English. However, as mentioned above, embodiments of the present disclosure are not limited to Hindi and/or English and can be displayed in any language.

The mobile device 102 can control, in response to an input to the user interface 104, operation of the control panel 112 and/or an event device 106 of the event devices 106. For example, the mobile device 102 can receive an input via the user interface 104 to cause the mobile device 102 to control operation of the control panel 112 by causing the control panel 112 to transmit information to the mobile device 102 such that the mobile device 102 can display the list of event devices 106 having faults, view a description of the faults, display a location of a selected event device 106 in a facility, display a total count of event devices having faults, display a diagnostic guide to remedy a fault, among other examples. As another example, the mobile device 102 can receive an input via the user interface 104 to cause the mobile device to control operation of an event device 106 of the number of event devices 106 by causing the event device 106 to perform a maintenance activity, view event device operational information, performing a test, among other examples, as is further described herein.

In some instances, the mobile device 102 can control certain operations of the control panel 112 and/or an event device 106 that need further authentication. For example, certain operations may not be allowed by some lower skill/less trained users. As such, a user may be prompted to enter user credentials via the user interface 104 of the mobile device 102. In response to the user credentials being entered and a user profile of the mobile device 102 (e.g., corresponding to the user of the mobile device 102) being verified, the mobile device 102 can control operation of the control panel 112 and the event device 106. The user credentials may include a username and password, biometric information corresponding to a user of the mobile device 102, among other types of user credentials.

In some examples, controlling the event device 106 can include causing the event device 106 to perform a maintenance activity. For example, a user of the mobile device 102 may desire to perform a maintenance activity on event device 106-1. The mobile device 102 can cause the event device 106-1 to perform a walk test, for instance, by receiving a user input via the user interface 104. The mobile device 102 can transmit the user input to the control panel 112, and the control panel 112 can cause the event device 106-1 to perform the walk test.

To help a user identify whether they are performing the maintenance activity on the correct event device 106, the mobile device 102 can cause the control panel 112 to cause the event device 106 to blink a lighting device viewable by the user. For example, a user may desire to test event device 106-1 during the walk test, but event devices 106-1 and 106-2 are located proximate to each other (e.g., located on a ceiling of a same room). The mobile device 102 can transmit a signal to the control panel 112, and the control panel 112 can transmit a signal to the event device 106-1 to flash a lighting device (e.g., a light emitting diode (LED)) of the event device 106-1 to verify the user is in communication with the event device 106 they wish to test. As such, the event device 106 to be under test can be verified by causing the particular event device 106 to flash its lighting device for a user.

In some examples, the user can view event devices 106 with faults. For example, a user may select event device 106-1 (e.g., having a fault) via the user interface 104 to troubleshoot the fault of the event device 106-1. The user interface 104 can display a diagnostic guide to help the user troubleshoot the fault associated with the event device 106-1. As is further described in connection with FIG. 2, the diagnostic guide can include step-by-step instructions that inform the user of the mobile device 102 certain steps they can take to remedy the fault.

Following the use of the diagnostic guide, the user interface 104 can display a prompt to allow the user of the mobile device 102 to receive feedback on the diagnostic guide. For example, the diagnostic guide may include step-by-step instructions on how to remedy a Config Checksum Fail of an event device 106. The user may provide feedback on how useful or helpful the steps of the diagnostic guide were. For instance, the user may provide feedback that states the step-by-step instructions should include more photographs to help the user visualize and/or illustrate how and/or where to perform the steps. The mobile device 102 can transmit such feedback to the remote computing device 108.

The remote computing device 108, as mentioned above, can be a cloud computing environment, running on the control panel 112, or running on the mobile device 102, in some examples. The remote computing device 108 can run machine learning models in order to improve the diagnostic guides provided by the mobile device 102. For example, the remote computing device 108 can determine, via machine learning models, that an amount of feedback has been received (e.g., that exceeds some data threshold) that the diagnostic guides relating to a particular issue (e.g., Config Checksum Fails) of event devices 106 and/or control panel 112 should be updated (e.g., with more photographs) to better assist users in diagnosing and troubleshooting the particular issue. Machine learning models executing on the remote computing device 108 can include supervised learning, unsupervised learning, regression, instance-based, decision tree, Bayesian, clustering, artificial neural networks, deep learning, among other types of machine learning techniques.

Although the remote computing device 108 is described above as modifying the diagnostic guide by adding more photographs, embodiments of the present disclosure are not so limited. For example, the remote computing device 108 can modify a diagnostic guide by adding more textual information, rearranging steps and/or textual information, recommending video tutorials be created and added, adding different questions to query a user, etc.

The diagnostic guides provided by the mobile device 102 can be generated and/or updated by receiving, by the remote computing device 108, various inputs. The inputs can be user inputs, data from event devices 106, data from the remote server 115, among other inputs. For example, an event device 106 may include an electrical fault. The remote computing device 108 may receive inputs including a battery manufacture date of a battery of the event device 106, a battery installation date, previous battery maintenance performed (e.g., service, maintenance logs, etc.), rated battery capacity, last known battery health information from the event device 106 or that of the control panel 112 (e.g., battery internal resistance, charging voltage, battery voltage, thermistor readings, etc.), battery load/size, etc. Such inputs can allow for the remote computing device 108 to generate and/or update diagnostic guides and predict maintenance needs for a user to view via the user interface 104 of the mobile device 102. For example, the diagnostic guides be generated and/or updated to include and/or update hints for possible causes (e.g., battery life overdue, charger circuitry faulty, thermistor is disconnected/damaged, battery is undersized, etc.), suggestions for troubleshooting (e.g., checking battery wiring, checking for blown fuses, checking for a non-functional charger, checking thermistor part, recalculating battery size/load, etc.), and/or recommendations for resolving the fault (e.g., replacing the battery, rewiring the battery, replacing fuse(s) that may be blown, replacing the thermistor, replacing the panel board, resizing the battery, etc.), among other examples.

Figure 2:
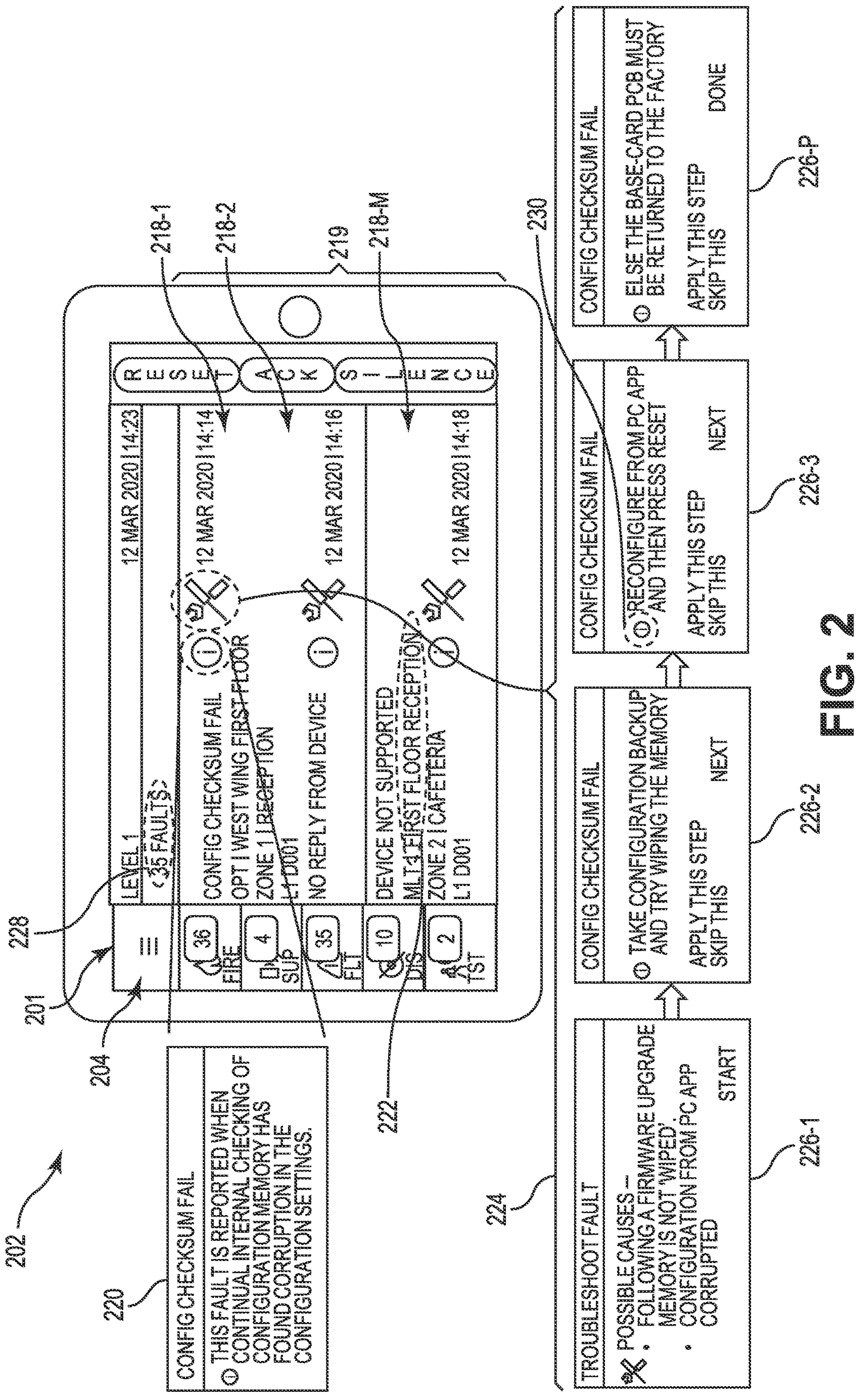
FIG. 2 is an illustration of a display provided on a user interface showing an event device analysis including a description of a fault and a diagnostic guide, generated in accordance with one or more embodiments of the present disclosure.

FIG. 2 is an illustration of a display provided on a user interface 204 showing an event device analysis 201 including a description 220 of a fault and a diagnostic guide 224, generated in accordance with one or more embodiments of the present disclosure. The user interface 204 can be included in a mobile device 202.

As illustrated in FIG. 2, the event device analysis 201 can include a list 219 of event devices, where the event devices include faults 218-1, 218-2, 218-M. Such event devices can be devices included in the system 100, previously described in connection with FIG. 1. Further, although not illustrated in FIG. 2 for clarity and so as not to obscure embodiments of the present disclosure, the event device analysis 201 can include a list of event devices included in the facility, where the list can include a sub-list (e.g., list 219) of the event devices that include faults 218-1, 218-2, 218-M.

The event device analysis 201 can include a total count 228 of event devices having faults. For example, as illustrated in FIG. 2, the facility can include 35 faults associated with various event devices included in the facility.

A user can select an event device from the list 219. For example, a user may wish to troubleshoot an event device having a fault and can select an event device having a fault from the list 219.

For example, in response to a selection of an event device from the list 219 of event devices having faults 218 via the user interface 204, the mobile device 202 can display a description 220 of the fault 218-1 corresponding to the selected event device. For instance, a user may select the icon with the circled "i", and the user interface 204 can display the description 220. The fault 218-1 can be a "Config Checksum Fail" and the description 220 can further explain to a user of the mobile device 202 what the Config Checksum Fail fault is (e.g., when continual internal checking of configuration memory has found corruption in the configuration settings [of the event device]). Such a description can further include a likely cause (e.g., corruption in configuration settings).

The user may wish to find further information about the event device having the fault 218-1. For example, upon selection of the fault 218-1, the user interface 204 can display a location 222 of the event device within an area of the facility including the control system. For instance, the event device having the fault 218-1 can be located in Zone 1 Reception area on the West Wing of the First Floor of the facility. Such information can help direct a user to the location 222 of the event device.

Upon selection of the fault 218-1, the user may desire to troubleshoot the fault 218-1. Accordingly, the user can select a diagnostic guide 224 (e.g., by selecting the icon having the "wrench and screwdriver"). Upon selection of the icon, the mobile device 202 can generate and display the diagnostic guide 224 to remedy the fault 218-1. The diagnostic guide 224 can suggest to the user possible reasons why the fault 218-1 may have occurred, as well as provide step-by-step instructions 226 to rectify the fault 218-1, as is further described herein.

As illustrated in FIG. 2, the user interface 204 can display step-by-step instructions 226 to remedy the fault 218-1. For example, at step 226-1, the user interface 204 can display the possible causes of the fault 218-1, e.g., memory may not have been wiped following a firmware upgrade or configuration from PC application may be corrupted. Either of these possible causes may have caused the Config Checksum Fail of the event device having the fault 218-1. Accordingly, the user may select "START" to start the troubleshooting guide.

At 226-2, the diagnostic guide 224 can include an instruction to a user to "Take configuration backup and try wiping the memory". Accordingly, a user may perform such steps and press "APPLY THIS STEP" or "NEXT". In some instances, a user may know that step 226-2 will not remedy the fault 218-1 or have already tried this step and can, accordingly, press "SKIP THIS".

At 226-3, the diagnostic guide 224 can include an instruction to a user to "Reconfigure from PC App and then press Reset". Similarly, a user may perform such steps and press "APPLY THIS STEP" or "NEXT", or in some instances, a user may know that step 226-3 will not remedy the fault 218-1 or have already tried this step and can, accordingly, press "SKIP THIS".

In some examples, a user may unclear about how to perform a step. For example, the user may not understand how to "Reconfigure from PC App and then press Reset". Accordingly, the diagnostic guide 224 can include a link 230 to event device product information. Such event device product information can be external information such as product manuals, videos, product information (e.g., technical details, voltage limits, etc.) that a user can view in order to gain further information about the event device and/or a step in the diagnostic guide 224.

In response to a selection of the link 230, the mobile device 202 can retrieve from a remote server (e.g., remote server 115, previously described in connection with FIG. 1), the event device product information. For example, the event device product information can be a video tutorial on how to "Reconfigure from PC App and then press Reset" for the event device. As another example, the event device product information can be a product manual on how to "Reconfigure from PC App and then press Reset" for the event device. Further, the event device product information can be other information describing the event device, such as other technical details about the event device. Accordingly, the mobile device 202 can retrieve the event device product information from the remote server and display, via the user interface 204, the event device product information. Access to the remote server can be, for instance, via a wired or wireless network relationship, such as Wi-Fi, mobile communication networks, the Internet, etc. Accordingly, the user may utilize the event device product information to "Reconfigure from PC App and then press Reset" for the event device having the fault 218-1.

At 226-P, the diagnostic guide 224 can include an instruction to a user that if the previous steps did not fix the fault 218-1, that the user should return the PCB to the factory as it may be faulty. Accordingly, the user can complete the step-by-step instructions 226 in the diagnostic guide 224 to troubleshoot the fault 218-1. Similar steps may be taken in order to troubleshoot faults 218-2 and/or 218-M by the user (e.g., selecting the faults 218-2 and/or 218-M, viewing descriptions 220 of the faults 218-2, 218-M, viewing diagnostic guides 224 for the faults 218-2, 218-M, etc.).

In some examples, the mobile device 202 can audibly emit the step-by-step instructions 226 via an audio output device (e.g., not illustrated in FIG. 2) of the mobile device 202. For example, the mobile device 202 can utilize a speaker that can audibly emit (via text-to-speech, voice assistant, and/or other audible mechanisms) the step-by-step instructions 226 of the diagnostic guide 224 for a user to listen to such instructions 226. Accordingly, a user may utilize the mobile device 202 in a hands-free setup in order to troubleshoot faults 218.

Additionally, although the event device analysis 201 is illustrated in FIG. 2 in English, embodiments of the present disclosure are not so limited. For example, the event deice analysis 201 can be displayed on the user interface 204 in any other language.

Figure 3:
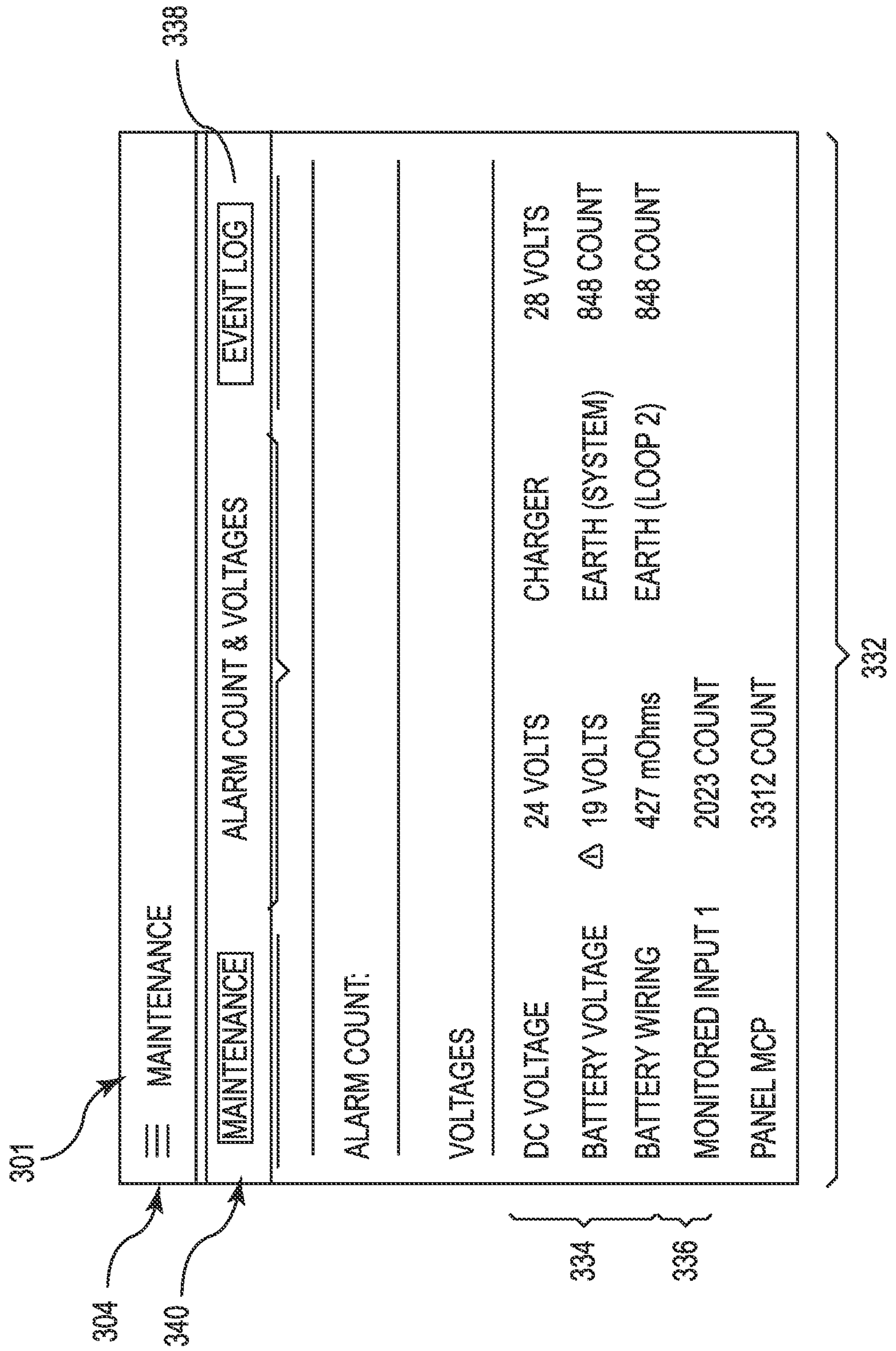
FIG. 3 is an illustration of a display provided on a user interface showing an event device analysis including event device operational information, generated in accordance with one or more embodiments of the present disclosure.

FIG. 3 is an illustration of a display provided on a user interface 304 showing an event device analysis 301 including event device operational information 332, generated in accordance with one or more embodiments of the present disclosure. The user interface 304 can be included in a mobile device.

As previously described in connection with FIG. 2, the event device analysis 301 can include a list of event devices included in the control system. A user may select one of the event devices (e.g., having a fault or not).

In response to the selection of the event device included in the list of the number of event devices in the control system, the mobile device can display, via the user interface 304, event device operational information 332 of the selected event device. Such event device operational information 332 is further described herein.

Event device operational information 332 can include, in some embodiments, event device voltage information 334. For example, the event device voltage information 334 can include information describing various electrical characteristics of the selected event device, such as a DC voltage (e.g., 24 Volts (V)), a battery voltage (e.g., 19 V), a battery wiring (e.g., 427 milli-Ohms (mOhms), a charger (e.g., 28 V), among other electrical characteristics of the selected event device.

Additionally, event device operational information 332 can include a live status 336 of the event device. For example, the live status 336 can include monitored counts associated with the event device. For instance, the event device may be a smoke detector and the live status 336 can be a smoke particulate count the smoke detector is currently detecting (e.g., 2023 counts).

Further, the event device operational information 332 can include an event log 338 of the event device. For example, a user may select the event log 338 icon to view prior information about the event device, including prior event device voltage information, prior smoke particulate counts, whether any events have been previously detected, etc.

Moreover, the event device operational information 332 can include maintenance notifications of the event device. For example, a user may select the maintenance 340 icon to view maintenance notifications of the event device, including when maintenance may be due for the event device (e.g., after a predetermined amount of time has expired, whether the event device sensors have drifted outside of predetermined calibration limits, etc.). A user may determine, based on the maintenance notifications, whether to perform maintenance on the event device.

Figure 4:
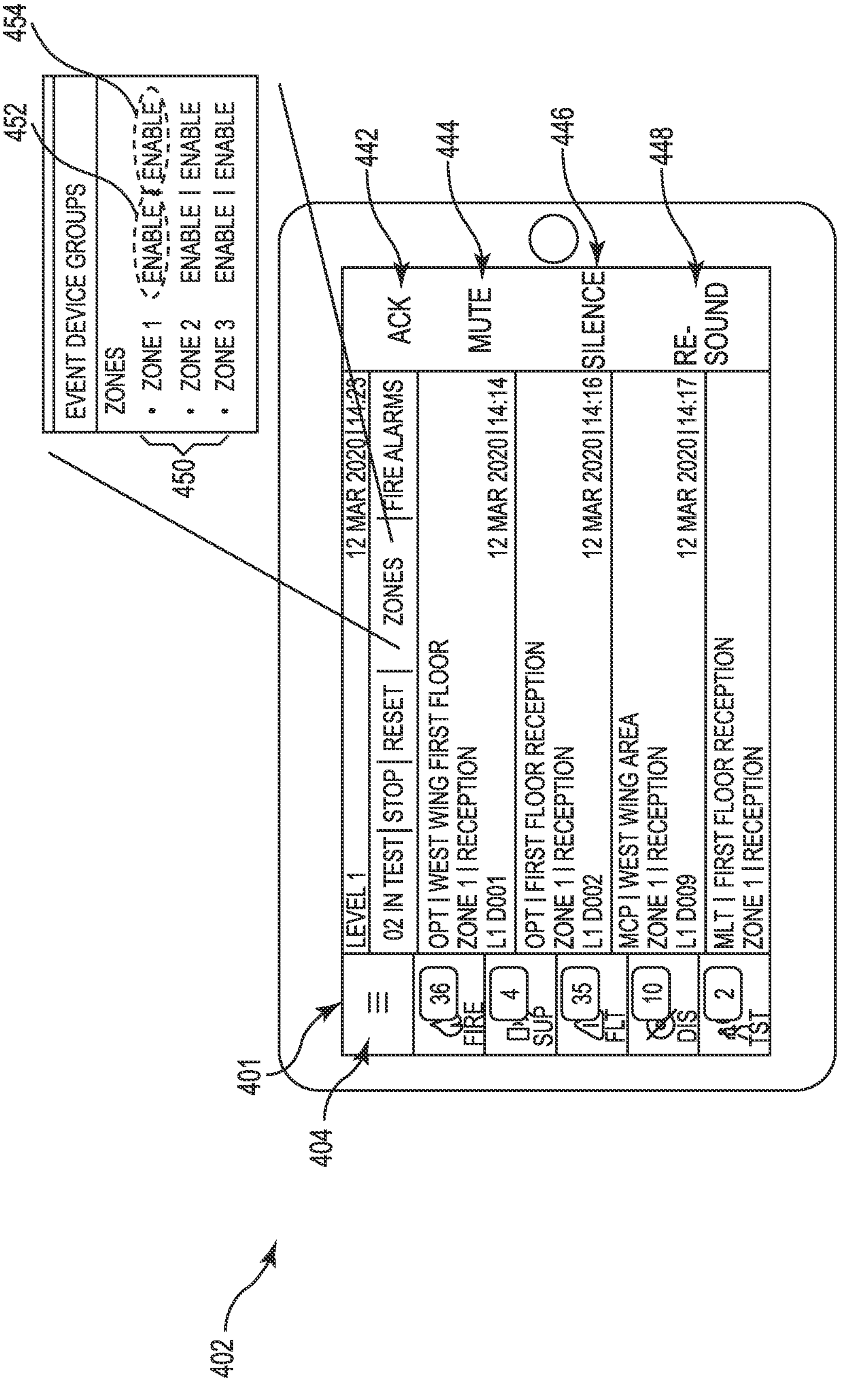
FIG. 4 is an illustration of a display provided on a user interface showing an event device analysis, generated in accordance with one or more embodiments of the present disclosure.

FIG. 4 is an illustration of a display provided on a user interface 404 showing an event device analysis 401, generated in accordance with one or more embodiments of the present disclosure. The user interface 404 can be included in a mobile device 402.

As previously mentioned in FIG. 1, the mobile device 402 can control certain operations of the control panel and/or an event device. In some embodiments, such control may be allowed after authentication of user credentials via the user interface 404.

The mobile device 402 can control an event device by causing the event device to perform a walk test. As used herein, the term "walk test" refers to a testing method of an event device in which the event device is intentionally activated to determine whether the activation is recognized by the control system. For example, a user may locate an event device and start the walk test via the user interface 404 of the mobile device 402. The user can determine, via the mobile device 402, whether the walk test was successful in response to the mobile device receiving a signal from the control panel (e.g., the event device notifies the control panel of its detection of an event (e.g., the intentional activation) and the control panel transmits the signal to the mobile device 402 indicating the same). Additionally, the user may stop the walk test and/or reset the walk test via the mobile device 402.

The mobile device 402 can further control the control panel in the control system. For example, in response to an alarm generated by an event device (e.g., in response to a hazard detected by the event device), the mobile device can acknowledge 442 the alarm (e.g., by a user selecting "ACK" via the user interface 404), mute 444 the alarm (e.g., by a user selecting "MUTE" via the user interface 404), silence 446 the alarm (e.g., by a user selecting "SILENCE" via the user interface 404), and/or re-sound 448 the alarm (e.g., by a user selecting "RE-SOUND" via the user interface 404).

In some examples, the mobile device 402 can control the control panel by enabling/disabling groups of event devices. For example, a group of event devices may be included in a facility. The groups may be sectioned into event device sub-groups 450 (e.g., different event device zones, as illustrated in FIG. 4), where different zones can be different sub-groups 450 of the group of event devices. For instance, Zone 1 may be a sub-group 450 of event devices included on a particular floor of the facility. Zone 2 may be a sub-group 450 of event devices in a particular area on a different floor of the facility, and Zone 3 may be a sub-group 450 of event devices in a different area on the different floor of the facility, etc. Accordingly, a user may wish to disable a sub-group 450 of event devices. The user can select, via the user interface 404, "DISABLE" 454 to disable a sub-group 450 of event devices included in the control system. In addition, a user may wish to enable the sub-group 450 of event devices, and similarly can select, via the user interface 404, "ENABLE" 452 to enable a sub-group 450 of event devices included in the control system.

Event device operation according to the present disclosure can allow for a user to utilize a mobile device to view an event device analysis and control operation of the control panel and/or event devices in the facility via the mobile device. Such an approach can allow for a user to perform tests on event devices, perform maintenance operations, view current event device operational information, and/or diagnose and fix faults associated with event devices and/or the control panel, among other uses without having a second user waiting by the control panel and having to make back and forth trips between the control panel and event devices within the facility. Accordingly, such an approach can allow for one user to perform activities using the mobile device instead of two, as compared with previous approaches.

Figure 5:
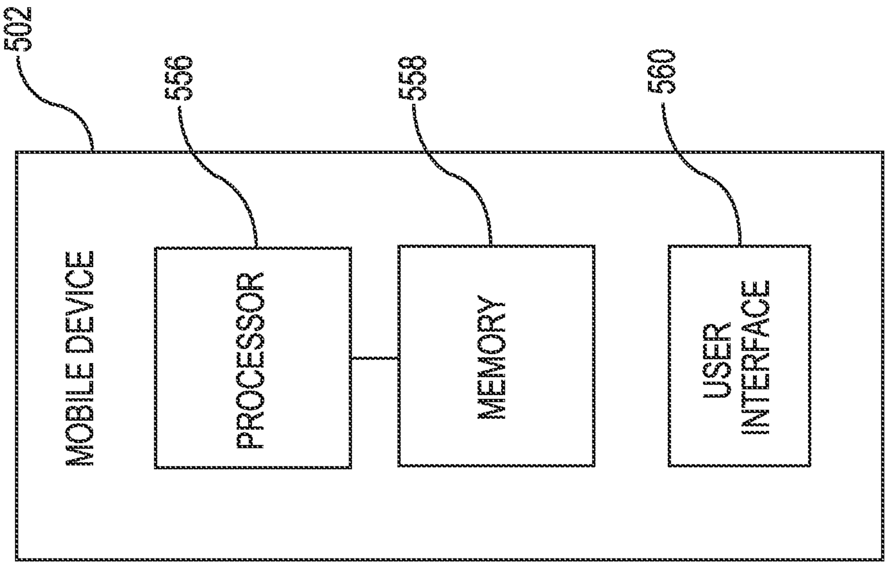
FIG. 5 is an example of a mobile device for event device operation, in accordance with one or more embodiments of the present disclosure.

FIG. 5 is an example of a mobile device 502 for event device operation, in accordance with one or more embodiments of the present disclosure. As illustrated in FIG. 5, the mobile device 502 can include a memory 558 and a processor 556 for event device operation in accordance with the present disclosure.

The memory 558 can be any type of storage medium that can be accessed by the processor 556 to perform various examples of the present disclosure. For example, the memory 558 can be a non-transitory computer readable medium having computer readable instructions (e.g., executable instructions/computer program instructions) stored thereon that are executable by the processor 556 for event device operation in accordance with the present disclosure.

The memory 558 can be volatile or nonvolatile memory. The memory 558 can also be removable (e.g., portable) memory, or non-removable (e.g., internal) memory. For example, the memory 558 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 558 is illustrated as being located within mobile device 502, embodiments of the present disclosure are not so limited. For example, memory 558 can also be located internal to another computing resource (e.g., enabling computer readable instructions to be downloaded over the Internet or another wired or wireless connection).

As illustrated in FIG. 5, mobile device 502 includes a user interface 560. For example, the user interface 560 can display an event device analysis (e.g., as previously described in connection with FIGS. 1-4) in a single integrated display. A user (e.g., operator) of mobile device 502 can interact with mobile device 502 via user interface 560. For example, user interface 560 can provide (e.g., display and/or present) information to the user of mobile device 502, and/or receive information from (e.g., input by) the user of mobile device 502. For instance, in some embodiments, user interface 560 can be a graphical user interface (GUI) that can provide and/or receive information to and/or from the user of mobile device 502. The display can be, for instance, a touch-screen (e.g., the GUI can include touch-screen capabilities). Alternatively, a display can include a television, computer monitor, mobile device screen, other type of display device, or any combination thereof, connected to mobile device 502 and configured to receive a video signal output from the mobile device 502.

As an additional example, user interface 560 can include a keyboard and/or mouse the user can use to input information into mobile device 502. Embodiments of the present disclosure, however, are not limited to a particular type(s) of user interface.

User interface 560 can be localized to any language. For example, user interface 430 can utilize any language, such as English, Spanish, German, French, Mandarin, Arabic, Japanese, Hindi, etc. Accordingly, the user interface 560 can display an event device analysis in a language corresponding to a physical geographic location of the mobile device 502.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A mobile device for event device operation, comprising:

a user interface;

a memory; and a processor configured to execute executable instructions stored in the memory to:

receive a signal from a control panel of a control system in response to the mobile device connecting to the control panel;

generate, based on the signal, an event device analysis for a number of event devices included in the control system, wherein the event device analysis includes a list of the number of event devices of the control system; and display, via the user interface, the event device analysis.

2. The mobile device of claim 1, wherein the processor is configured to execute the instructions to control, in response to an input to the user interface, operation of an event device of the number of event devices.

3. The mobile device of claim 2, wherein the processor is configured to execute the instructions to control the operation of the event device by causing the event device to perform a maintenance activity in response to the input to the mobile device.

4. The mobile device of claim 1, wherein the processor is configured to execute the instructions to control, in response to an input to the user interface, operation of the control panel.

5. The mobile device of claim 4, wherein the processor is configured to execute the instructions to control the operation of the control panel by causing the control panel to:

acknowledge an alarm generated by the event device;

mute the alarm generated by the event device;

silence the alarm generated by the event device; or re-sound the alarm generated by the event device.

6. The mobile device of claim 4, wherein the processor is configured to execute the instructions to control the operation of the control panel by causing the control panel to:

disable a sub-group of the number of event devices included in the control system; or enable the sub-group of the number of event devices included in the control system.

7. The mobile device of claim 1, wherein the event device analysis further includes a list of event devices of the control system having faults.

8. The mobile device of claim 7, wherein in response to a selection of a fault corresponding to an event device from the list of event devices, the processor is configured to execute the instructions to display:

a location of the event device within an area of a facility including the control system via the user interface; and a description of the selected fault via the user interface.

9. The mobile device of claim 7, wherein in response to a selection of a fault corresponding to an event device from the list of event devices, the processor is configured to execute the instructions to display a diagnostic guide via the user interface to remedy the selected fault.

10. A mobile device for event device operation, comprising:

a user interface;

a memory; and a processor configured to execute executable instructions stored in the memory to:

receive a signal from a control panel of a control system in response to the mobile device connecting to the control panel;

generate, based on the signal, an event device analysis for a number of event devices included in the control system, wherein the event device analysis includes:

a list of the number of event devices of the control system; and a list of event devices of the control system having faults; and display, via the user interface, the event device analysis.

11. The mobile device of claim 10, wherein in response to a selection of a fault corresponding to an event device from the list of event devices having faults, the processor is configured to execute the instructions to display step-by-step instructions to remedy the fault via the user interface.

12. The mobile device of claim 11, wherein:

the mobile device includes an audio output device; and the processor is configured to execute the instructions to audibly emit the step-by-step instructions via the audio output device.

13. The mobile device of claim 10, wherein in response to a selection of an event device included in the list of the number of event devices of the control system, the mobile device is configured to display, via the user interface, operational information of the event device.

14. The mobile device of claim 10, wherein the mobile device is configured to receive the signal from the control panel in response to the mobile device wirelessly connecting to the control panel.

15. A control system for event device operation, comprising:

a control panel;

a number of event devices connected to the control panel;

a mobile device having a user interface, wherein the mobile device is configured to:

receive a signal from the control panel in response to the mobile device connecting to the control panel;

generate, based on the signal, an event device analysis for a number of event devices included in the control system, wherein the event device analysis includes a list of the number of event devices of the control system; and display, via the user interface, the event device analysis.

16. The control system of claim 15, wherein the mobile device is configured to control at least one of operation of the control panel and an event device of the number of event devices.

17. The control system of claim 16, wherein the mobile device is configured to control the operation of the event device by initiating a walk test of the event device in response to a selection of the event device from the list of the number of event devices by causing the event device to activate.

18. The control system of claim 17, wherein the mobile device is configured to cause, in response to an input to the user interface, the event device doing the walk test to flash a lighting device of the event device.

19. The control system of claim 16, wherein the mobile device is configured to control at least one of the operation of the control panel and the event device in response to user credentials corresponding to a user profile of the mobile device being verified.

20. The control system of claim 15, wherein:

the control panel further includes a user interface; and the mobile device is configured to duplicate and display, on the user interface of the mobile device, the user interface of the control panel.

* * * * *